US008140325B2

(12) United States Patent
Kanevsky et al.

(10) Patent No.: US 8,140,325 B2
(45) Date of Patent: Mar. 20, 2012

(54) SYSTEMS AND METHODS FOR INTELLIGENT CONTROL OF MICROPHONES FOR SPEECH RECOGNITION APPLICATIONS

(75) Inventors: Dimitri Kanevsky, Ossining, NY (US); Mahesh Viswanathan, Yorktown Heights, NY (US); David Nahamoo, Great Neck, NY (US); Roberto Sicconi, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 11/619,793

(22) Filed: Jan. 4, 2007

(65) Prior Publication Data

US 2008/0167868 A1    Jul. 10, 2008

(51) Int. Cl.
     *G10L 21/02*    (2006.01)
(52) U.S. Cl. ........................................ 704/226; 704/233
(58) Field of Classification Search .................. 704/226, 704/233
See application file for complete search history.

(56) References Cited

U.S. PATENT DOCUMENTS

| | | | | |
|---|---|---|---|---|
| 5,528,731 A * | 6/1996 | Sachs et al. | ................... | 704/246 |
| 6,038,532 A * | 3/2000 | Kane et al. | ..................... | 704/233 |
| 6,101,258 A * | 8/2000 | Killion et al. | ................. | 381/321 |
| 6,253,179 B1 * | 6/2001 | Beigi et al. | ..................... | 704/243 |
| 6,336,091 B1 * | 1/2002 | Polikaitis et al. | ............. | 704/233 |
| 6,389,393 B1 * | 5/2002 | Gong | ........................... | 704/244 |
| 6,411,927 B1 * | 6/2002 | Morin et al. | ................... | 704/224 |
| 6,434,520 B1 * | 8/2002 | Kanevsky et al. | ............ | 704/243 |
| 6,754,373 B1 | 6/2004 | de Cuetos et al. | | |
| 7,315,812 B2 * | 1/2008 | Beerends | .................... | 704/200.1 |
| 7,415,410 B2 * | 8/2008 | Campbell et al. | ............. | 704/246 |
| 7,487,089 B2 * | 2/2009 | Mozer | ........................... | 704/246 |
| 7,603,275 B2 * | 10/2009 | Tavares | ......................... | 704/250 |
| 2002/0002455 A1 * | 1/2002 | Accardi et al. | ............... | 704/226 |
| 2003/0055627 A1 * | 3/2003 | Balan et al. | ................. | 704/200.1 |
| 2003/0147540 A1 * | 8/2003 | Oster et al. | .................... | 381/111 |
| 2004/0093206 A1 * | 5/2004 | Hardwick | ..................... | 704/221 |
| 2004/0111258 A1 * | 6/2004 | Zangi et al. | ................... | 704/226 |
| 2004/0128127 A1 * | 7/2004 | Kemp et al. | ................... | 704/225 |
| 2005/0147255 A1 * | 7/2005 | Little | .............................. | 381/26 |
| 2006/0047386 A1 * | 3/2006 | Kanevsky et al. | .............. | 701/36 |
| 2006/0259304 A1 * | 11/2006 | Barzilay | ....................... | 704/273 |
| 2007/0038442 A1 * | 2/2007 | Visser et al. | ................... | 704/233 |
| 2007/0239441 A1 * | 10/2007 | Navratil et al. | .............. | 704/225 |
| 2007/0239448 A1 * | 10/2007 | Zlokarnik | ..................... | 704/238 |
| 2007/0299670 A1 * | 12/2007 | Chang | .......................... | 704/275 |

(Continued)

FOREIGN PATENT DOCUMENTS

GB       2346001       7/2007

OTHER PUBLICATIONS

Pelecanos et al., "Addressing Channel Mismatch through Speaker Discriminative Transforms", Speaker and Language Recognition Workshop, 2006, IEEE Odyssey 2006.

(Continued)

*Primary Examiner* — Douglas Godbold
(74) *Attorney, Agent, or Firm* — F. Chau & Associates, LLC; Anne V. Dougherty, Esq.

(57) ABSTRACT

Systems and methods for intelligent control of microphones in speech processing applications, which allows the capturing, recording and preprocessing of speech data in the captured audio in a way that optimizes speech decoding accuracy.

7 Claims, 4 Drawing Sheets

U.S. PATENT DOCUMENTS

2008/0256613 A1* 10/2008 Grover .............................. 726/5
2009/0012786 A1* 1/2009 Zhang et al. .................. 704/233
2009/0106021 A1* 4/2009 Zurek et al. ................... 704/226

OTHER PUBLICATIONS

International Search Report from United Kingdom.
Anastasios Anastasakos, et al., "Adaptation of New Microphones Using Tied-Mixture Normalization," Proceedings of ICASSP '94. IEEE International Conference on Acoustics Speech and Signal Processing, vol. 1, Apr. 19, 1994-Apr. 22, 1994 pp. 1/433-1/436, XP002474905 Adelaide, SA, Australia ISBN: 07803-1775-0.
Anastasios Anastasakos, et al., "Adaptation of New Microphones Using Tied-Mixture Normalization," Proceedings of ICASSP '94. IEEE International Conference on Acoustics Speech and Signal Processing, Apr. 22, 1994 pp. 1/433-1/436, XP002474905 Adelaide, SA, Australia ISBN: 07803-1775-0.

\* cited by examiner

SYSTEMS AND METHODS FOR INTELLIGENT CONTROL OF MICROPHONES FOR SPEECH RECOGNITION APPLICATIONS

TECHNICAL FIELD OF THE INVENTION

The present invention relates generally to systems and methods to support intelligent control of microphones and, in particular, to intelligent microphone control systems and methods that are employed in speech processing applications to capture, record and preprocess audio input in a way that optimizes decoding accuracy of spoken input.

BACKGROUND

Technological innovations in speech processing applications have led to widespread development of speech-based automated systems and applications using automated speech recognition (ASR) and/or natural language understanding techniques. For example, speech recognition systems are being implemented to support hands-free command and control of various functions within a car environment. Moreover, speech recognition systems may be implemented for dictation/transcription applications to record and recognized spoken input from one or more persons and automatically generate a textual transcription that is stored and subsequently used for various applications (archiving, indexing, etc.).

There are various factors that can negatively affect the decoding accuracy of spoken input by ASR systems. For instance, in ASR applications, speech decoding accuracy can vary depending on the type of microphone system that is used to capture spoken input, the manner in which a person uses the microphone system and/or the varying environmental conditions that may exists at different times during capture and recordation of audio input by the microphone system. For instance, when a person uses a microphone having a manual talk switch (to manually turn on/off the microphone), the manual operation of the talk switch may lead to poor synchronisation between the time at which the talk switch button is pressed and the user begins speaking. For example, it a user simultaneously presses the talk switch button and begins to speak, the first spoken utterance may be chopped-off, or if the user begins speaking too late, environmental noise may be added to the audio input, leading to decreased decoding accuracy.

In other circumstances, the decoding accuracy of an ASR system can be adversely affected when the distance between the speaker's mouth and the microphone is varied during a speech session. For instance, for lip microphone devices, the distance between the lip microphone and the persons' mouth can change during a session resulting in possible degradation in decoding accuracy. Similar problems exists when using fixed microphones (e.g., in a car) which are sensitive to how a person is positioned near the microphone and the direction that the person faces when speaking.

Other causes of decreased decoding accuracy in ASR systems due to microphones that the ASR applications typically require the microphone parameters to be adapted and adjusted to the ASR system, as well as adapted and adjusted based on the speaker. For example, some conventional speech applications require the microphones to be set and re-adapted to the speech recognition system each time a new person begins a new dictation session. If certain adjustments and adaptations are not made for each new person using the speech recognition system, the error rate of the speech recognition can significantly increase.

For example, an ASR system may require various steps for adjusting the microphone system so as to optimize the speech recognition decoding accuracy. First, the ASR system determines an average level of static environmental noise in a given environment (no speech). Next, the system, may request spoken input by a person in the given environment, which allows the system to determine the volume of the speaker's voice relative to the static environmental noise, which is then used to adjust the sensitivity and volume of the microphone input. Typically, after the system adjusts the volume input level, other additional parameters in the ASR system may be adapted to an individual speaker when reading a particular prepared passage. In particular, each new user may be required to read a prepared passage after the volume has been, adjusted so as to adjust an array of parameters to fine tune adjust the microphone and better adapt the ASR system to the current user.

These microphone adjustment procedures of the ASR system may be problematic and impractical in certain applications. For example, when an ASR system is used for transcription of conferences, these microphone adjustment procedures may be too burdensome and thus not followed. In particular, at conferences and meetings, a microphone and ASR system is typically located on the podium or in the middle of a meeting table. In some instance, the microphone is head-mountable and located at the speaker's lips for accurate input. When speaking at a conference, each speaker may have time to activate his/her user-specific (pre-trained) speech model that was previously trained and stored in the ASR system, but there is typically no time for each speaker to perform a microphone adjustment process (as described above), which may foe needed to adjust the parameters of the ASR system to the speaker's personal speech patterns to obtain an optimal transcription.

The decoding accuracy of an ASR system can also foe affected depending on the type of microphone that was used when training the ASR system or when using the ASR system. For example, decoding accuracy can be decreased when the type of microphone used by a person to train the ASR system is different from the type of microphone used by that person when giving a lecture during a transcription or dictation session. By way of specific example, a person will typically train an ASR system by providing speech training data using a wired microphone connected to the ASR system, while the same speaker may actually use a wireless microphone when using the ASR system during a lecture, meeting, conference, which can lead to decreased decoding accuracy.

SUMMARY OF THE INVENTION

In general, exemplary embodiments of the invention include systems and methods to support intelligent control of microphones. More specifically, exemplary embodiments of the invention include intelligent microphone control systems and methods that are employed in speech processing applications to capture, record and preprocess audio input in a way that optimizes decoding accuracy of spoken input.

In one exemplary embodiment, an audio processing system, includes a microphone control system, a speech activity detection system and an acoustic quality control system. The microphone control system controls capturing of audio input to a microphone system and selectively outputs speech segments within captured audio to a speech decoding system. The speech activity detection system detects the timing of speech activity events which indicate timing of speech input to the microphone system. The timing of speech activity events are used to determine the speech segments within captured audio.

The speech activity events include events such as (i) microphone switch button actions, (ii) speech intent events that indicate a user's intention to speak into the microphone, which are derived from biometric feature data of the user, (iii) speech intent events that indicate a user's intention to speak into the microphone, which are derived from data acquired from tracking behavioral characteristics of the user, and/or detection of speech in captured audio.

The acoustic quality control system detects conditions regarding capturing of audio input to the microphone system, which can result in captured audio with acoustic characteristics that adversely affect a decoding accuracy of the captured audio. In one embodiment, the acoustic quality control system provides feedback to a user regarding a detected condition having an adverse affect on an acoustic quality of audio input. In another embodiment, the acoustic quality control system automatically adjusts one or more system parameters to compensate for degraded acoustic characteristics of the captured audio.

For example, the acoustic quality control system can detect a change in an environmental static noise level and automatically adjust a microphone volume sensitivity parameter. The acoustic quality control system, can detect a distance between a microphone and a speaker's mouth, and automatically adjusts a microphone volume parameter and microphone volume sensitivity parameter based on the detected distance. In other embodiments, the acoustic quality control system can detect a condition in which a speaker uses a microphone that is different from a microphone used by the speaker for training the speech decoding system, and automatically modulate the captured audio input to substantially match an audio signal of the training microphone.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
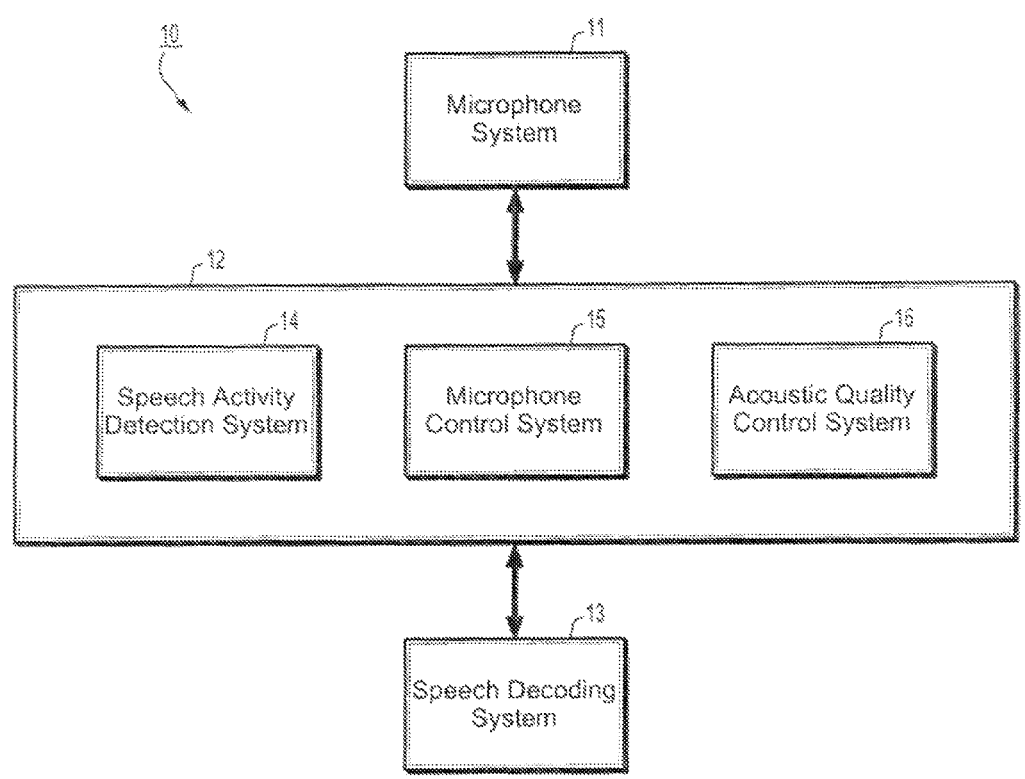
FIG. 1 is a high-level block diagram of an audio processing system having an intelligent microphone control system according to an exemplary embodiment of the invention.

FIG. 1 is a high-level block diagram of as audio processing system (10) having an intelligent microphone control system according to an exemplary embodiment or the invention. In general, the audio processing system (10) comprises a microphone system (11), a microphone manager system (12) and a speech decoding system (13). The microphone system (11) includes a microphone for capturing speech input to be decoded by the speech decoding system (13) for a given speech-based application supported by the speech decoding system (13) (e.g., dictation/transcription application, speech-based command/control application). The microphone manager (12) comprises a speech activity detection system (14), a microphone control system (15) and an acoustic quality control system (16), which implement automated methods to control the capturing and recording audio input to the microphone system (11) and to control the inputting of captured audio to the speech decoding system (13).

In particular, the microphone control system (15) implements automated functions to control the activation and deactivation of microphone(s) for capturing and recording audio input to the microphone system (11) and to control the inputting of segments of captured audio having relevant speech data to the speech decoding system (13). As explained belong the microphone control system (15) operates in conjunction with the speech activity detection system (14) and/or the acoustic quality control system (16) to control the processing and routing of captured audio with speech data so as to enhance the speech decoding performance by the speech decoding system (13).

For example, in one exemplary embodiment of the invention, the microphone control system (15) may operate in conjunction with the speech activity detection system (14) to identify and selectively input segments of captured audio having relevant speech data. More specifically, the speech activity detection system (14) implements functions to detect one or more types of speech activity events during audio capturing, which serve as indicators of speech input to the microphone system (11). In various embodiments of the invention, speech activity events include user interactions with microphone switch buttons, speech intent events that indicate a user's intention to speak into the microphone (as determined based on processing of biometric feature data of the user and/or from data acquired from tracking behavioral characteristics of the user, etc.), and other types of speech activity events, as will be discussed in further detail below.

The detection of speech activity events provides information that enables determination of timing of speech input of a user, e.g., speech onset, speech offset, ongoing speech, etc. The detection and timing of speech activity events enables the microphone control system (15) to control microphone activation for capturing/recording audio with speech input. Moreover, the timing of speech activity events can be used to determine segments within captured audio having useful speech data. Indeed, the boundaries of speech segments within captured audio can be robustly and accurately determined/estimated based on combined timing information for multiple speech activity events, allowing the microphone control system (15) to capture ail relevant speech input by a user and selectively input to the speech decoding system (13) those segments of the captured audio having speech data without noise.

In another exemplary embodiment of the invention, the microphone control system (15) may operate in conjunction with the acoustic quality control system (16) to control capturing of audio by the microphone system in a way that enhances the acoustic quality of captured audio. More specifically, the acoustic quality control system (16) can implement functions to detect conditions under which capturing of audio input to the microphone could result in the capture of audio with degraded acoustic characteristics, thereby adversely affecting the decoding accuracy of the captured audio. For instance, as explained in further detail below, the acoustic quality control system (16) can implement functions to detect changes in environmental static noise levels and/or detect the distance between a microphone and a speaker's mouth, and automatically adjust microphone parameters such as volume sensitivity and volume or decoding system parameters, as appropriate so to ensure the acoustic quality of the captured audio and thus, improve the decoding accuracy of speech data. The acoustic quality control system (16) may be configured to provide feedback to a user regarding a detected condition having an adverse affect on an acoustic quality of audio input allowing the user to make manual adjustments or take appropriate measures to ensure the acoustic quality of the captured audio.

It is to be understood that FIG. 1 is a high-level system architecture framework which illustrates the use of an intelligent microphone management system (12) to control capturing and processing of audio input from a microphone (11) to the speech decoding system (13) so as to optimize the decoding accuracy of the speech decoding system (13). The microphone manager (12) can implement one or both of the speech activity detection system (14) and acoustic quality control system (16) depending on the target application. Moreover, the speech activity detection system (14) and acoustic quality control system (16) can be designed with various frameworks depending on the target application. For illustrative purposes, an exemplary embodiment or an audio processing system having an intelligent microphone control system, which is based on the framework of FIG. 1, will now be explained in detail with reference to FIG. 2.

Figure 2:
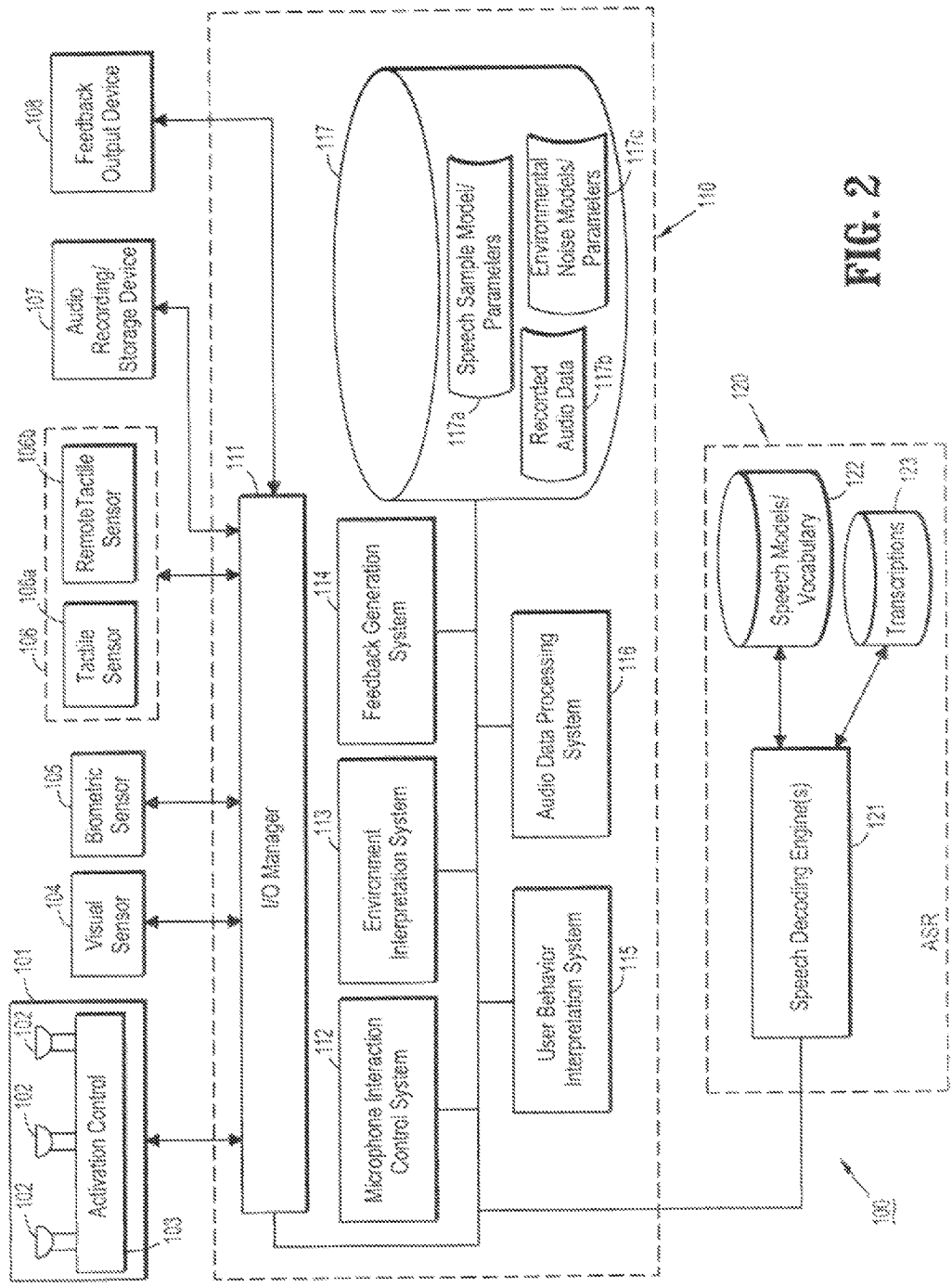
FIG. 2 is a block diagram illustrating an audio processing system having an intelligent microphone control system according to another exemplary embodiment of the invention.

FIG. 2 is a block diagram of a speech processing system (100) having an intelligent microphone control system according to an exemplary embodiment of the invention. In general, the system (100) comprises a microphone system (101), a microphone manager (110), and an automatic speech recognition (ASR) system (120). The system (100) further comprises an audio recording and storage device (107), a feedback output device (108) and a sensor system including sensor devices such as a visual sensor (104), a biometric sensor (105) and a microphone control sensor (106) (e.g., control switch having tactile sensors (106a) and/or (106b)).

The microphone system (101) comprises a plurality of microphones (102) and a microphone activation/selection controller (103). The microphone manager system (110) may implement various intelligent microphone control methods using multi modal input from the sensor devices to control audio capture by the microphone system (101), determine speech segments within captured audio for input to the ASR system (120), and/or control acoustic quality of captured audio. The ASR system (120) comprises one or more speech decoding engines (121) for processing speech data using trained speech models, language models, vocabularies, etc., which are maintained in a persistence storage system (122). The ASR system (120) can be used to transcribe spoken utterances for dictation applications. Text transcriptions (123) can be persistently stored and indexed along with spoken utterances. The ASR system (120) can be used to provide support for a speech interface for command and control and conversational interaction with speech-enabled application. Depending on the application, the speech decoding engines (121) may include ASR engines, NLU (natural language understanding) engines, speaker identification engines, etc.

The microphone manager (110) comprises an I/O manager (111), a microphone interaction control system (112), an environment interpretation system (113), a feedback generation system (114), a user behavior interpretation system (115), an audio data processing system (116) and a local storage system (117). The I/O manager module (111) performs various functions such as managing the I/O data that is input and output to the various components (101, 104, 105, 106, 107, 108) and otherwise providing an API for communication of messages and data between the microphone manager (110) the external systems/components.

The microphone interaction control system (112) controls activation and selection of the one or more microphones (102) of the microphone system (101) via the activation control module (103) to capture audio input from one or more microphones (102) under different modes of operation, and to store the captured audio input in the remote/external storage device (107) and/or as recorded audio data (117b) in the local storage system (117). The microphone interaction control system (112) controls the input of audio segments to the ASR system (120) to ensure that only those audio segments having relevant speech data are input to the ASR system (120) for decoding. The microphone interaction control system (112) uses timing of speech activity events to control the capturing and recording of audio input from the microphone system (101) and to determine the boundaries of speech segments within captured audio for input to the ASR system (120).

The user behavior interpretation system (115) and audio data processing system (116) implement methods to support speech activity detection. For example, the user behavior interpretation system (115) implements methods for collecting and processing multimodal input from various sensors (104, 105, 106a, 106b) as a user interacts with the system to determine speech activity events and otherwise determine speech intent and timing of speech activity (speech onset/offset, etc.). The audio data processing system (116) may implement known audio-based techniques for processing the audio input to detect onset of speech (e.g., audio processing techniques that allow determination when the speech energy in audio input crosses a predetermined threshold).

The microphone interaction control system (112) can detect the timing of speech onset based on a combination of the timing of various events such as talk switch depression, audio detection of speech onset, etc., to more accurately detect speech onset and speech segment boundaries within captured audio, and thereby route the audio input (with speech data) to the speech recognition system (120).

For instance, the microphone control sensor (106) can be a microphone button (talk switch button) that a speaker can actuate to turn on/off the microphone. The timing of user actuation of the talk switch button is one indicator of speech onset. However, to avoid problems associated with poor synchronisation between user actuation of microphone talk switch buttons (106) and user speech input, one or more sensors can be used that can capture moments before a user touches a talk-switch button to activate a microphone and record audio input. For instance, the talk switch button (106) can implement the tactile sensor (106a) and/or the remote tactile sensor (106b). The tactile sensor (106a) can be a super-sensitive pressure sensor that can detect a light touch of a finger on a button prior to the user actually applying the required pressure to actuate (turn on/off) the control button. The remote tactile sensor (106b) can be utilized to sense when a person's finger is in proximity to the control button and thus detect the user's speech intent moments before the speaker actually touches the control button.

For example, a close distance "remote touch" sensor can be incorporated in a talk switch button to "feel" when a person's finger is in proximity to the talk switch button before the finger actually touches the button (e.g. using infra ray detection). In this regard, the microphone can be activated when a finger is close to a button as detected by a "remote touch" sensor (rather then when a finger is already on the button). The touch sensor embodiments enable the system to detect speech intent prior to switch activation allowing useful speech to be captured when a person actually begins speaking just before the talk switch button is actually depressed to turn on the microphone. Speech onset and speech activity can be detected based on the timing of tactile sensor events and actual detection of speech in the audio signal.

In another embodiment, the visual sensor (104) may be a video sensor (camera) that is used to capture image data that is processed to provide visual clues that are indicative of speech intent. For example, the image data may be processed to track hand movement and detect when the user's finger is about to touch the control button, which is an indicator of onset of speech activity. This visual clue can be used to turn on a mike when a finger is close to a button (rather then when a finger is already on the button).

Moreover, the video camera (104) may be used to capture images of a person's face. The user behavior interpretation system (115) may implement methods for processing the image data to extract facial features such as lips mouth pose and other body data to detect speech activity events such as speech onset to activate capturing and recording of audio input based on visual speech clues, using those techniques such as disclosed in U.S. Pat. No. 6,754,373 to de Cuetos, et al., entitled "System and Method for Microphone Activation using Visual Speech Clues", which is commonly assigned and fully incorporated herein by reference. The user behavior interpretation system (115) may implement methods for interpreting user behavior patterns using multimodal sensor data input to identify a user's intent to provide speech input to a microphone prior to user actuation of the talk switch button (106). In other words, the user behavior recognition system (115) can process multimodal sensor data from a plurality of biometric, tactile sensors, etc., to automatically recognize user synchronized behavior patterns that precede user activation of a talk switch button for purposes of estimating the onset speech input (e.g., spoken command) and therefore start to record audio input for the command before the user actually presses the switch button (106). For example, the system may learn that a given user will typically look directly at a control button before actuation of a talk switch button when the user is planning to utter a command, whereby suitable sensors (104) or (105) may be used to track eye movement toward the location of the microphone talk switch button.

In another exemplary embodiment, the audio input can be continually recorded and stored as recorded audio data (117b) in a local memory (117) or in a remote memory (107), and such audio input can be input to the audio processing system (116) to detect the onset of the useful speech. By recording the audio input, the microphone interaction control system (112) can retrieve additional audio segments from memory that are determined to have speech data, but were inadvertently missed due to error (e.g., the speaker began speaking before pressing the talk switch button and/or speech activity in audio input not properly detected, etc.).

In other exemplary embodiments of the invention, the microphone manager (110) includes acoustic quality control functions for processing sensor data and/or captured audio input to detect certain conditions that could potentially reduce the decoding accuracy (by the ASR system (120)) of speech input. Based on the detected conditions, the microphone manager (110) can provide user feedback so as to allow a user to make any corrections or adjustments that may be necessary and/or automatically and seamlessly making corrections or adjustments that may be desired for capturing and/or pre-processing audio input to enhance speech decoding accuracy. These acoustic quality control functions are supported by system modules such as the environment interpretation system (113) and feedback generation system (114).

In particular, the environment interpretation system (113) can implement methods for processing sensor data and environmental static noise to detect conditions that could possibly have an adverse affect on the decoding accuracy of speech data and then automatically adjust microphone and/or decoding parameters to adapt to different speakers and/or changes in environmental noise levels. For instance, the environment interpretation system (113) can determine or otherwise detect the static environmental noise in an audio signal received via a user microphone or a microphone specifically implemented as a detector of the non-speech environment and generate and update models/parameters of the environmental noise (117c), which are stored in local memory (117). The noise models (117c) can be used to automatically make adjustments to microphone and/or decoding parameters for different speakers and/or changing environmental noise levels by transforming a speaker's voice by adapting microphone volume sensitivity depending on environmental input received from the detector of non-speech environment and input from voice sampling (117a) that is locally stored in memory (117) for a given speaker. Moreover, the environmental interpretation system (113) can process sensor data detect location and distance between a microphone and a speaker's mouth and either adjust the lip microphone position or compensates degradation of audio input because of incorrect position of a microphone.

In this regard, the microphone system (101) may comprise a plurality of different microphones (102) that are implemented for different tasks. For example, different types/classes of microphones may be provided in embodiments where the microphone manager (110) implements methods to selectively activate a particular one of the microphones (102) for capturing speech input from a speaker, which is determined to foe the same or similar to a microphone used by the speaker for training the ASR system (120). Moreover, one or more microphones (102) can serve to capture speech input from speakers, and one or more of the microphones (102) may foe used to monitor/capture environmental audio data, which is used to track changes in environmental noise levels.

The feedback generation system (114) may implement methods to provide feedback to a user about different parameters/conditions affecting the quality of captured audio due to inefficient microphone use or sub-optimal decoding parameters, etc., which could not be fixed automatically. The feedback generation system (114) may implement methods for processing and rendering feedback data output from the environment interpretation system (113), which is presented to a user via the feedback output device (108) (e.g., display or spoken output).

For example, the system can provide feedback to a user to indicate SNR (signal to noise ratio, recognition confidence measures, sentence-level confidence measures, and partial playback of the recognized text as text on the screen or synthesized voice. Further, the feedback generation system (114) may track the input volume which a user speaks into a microphone and provide some form of feedback that informs the user whether the user's speech volume is too loud or too low (which can reduce decoding accuracy) or at an optimal level for decoding. By way of specific example, the system can display a colored bar that shows the voice volume, green/yellow/red to show normal signal, borderline, too loud, etc., and where the system can provide an indication to the user that the system is listening and capturing the speech input when a length of brightness of a lighted bar quickly tracks the user's voice activity.

In other embodiments, a camera can be used to detect abnormal situations such as when a user is talking to a decoding system while the microphone is deactivated. In other embodiments, the feedback generation system (114) can be used to playback the user's voice or even just the ambient noise without noise, allowing the user to have some idea as to whether the system is having difficulty in decoding the speech input.

It is to be understood that the system of FIG. 2 is an exemplary embodiment that illustrates various features and system components that may be used to support intelligent microphone management and control functions according to exemplary embodiments of the invention. Moreover, it should be noted that various system components and modules depicted in FIG. 2 are optional features that may (or may not) be implemented, depending on the target application (e.g., recording and transcription of lecture, speech command and control in various environments (e.g., car). In this regard, the microphone manager (110) can be configured to have one or more operating modes depending on the target application. Exemplary modes of operation of the audio processing system (100) of FIG. 2 according to the invention will now be discussed with reference to FIGS. 3-4.

Figure 3:
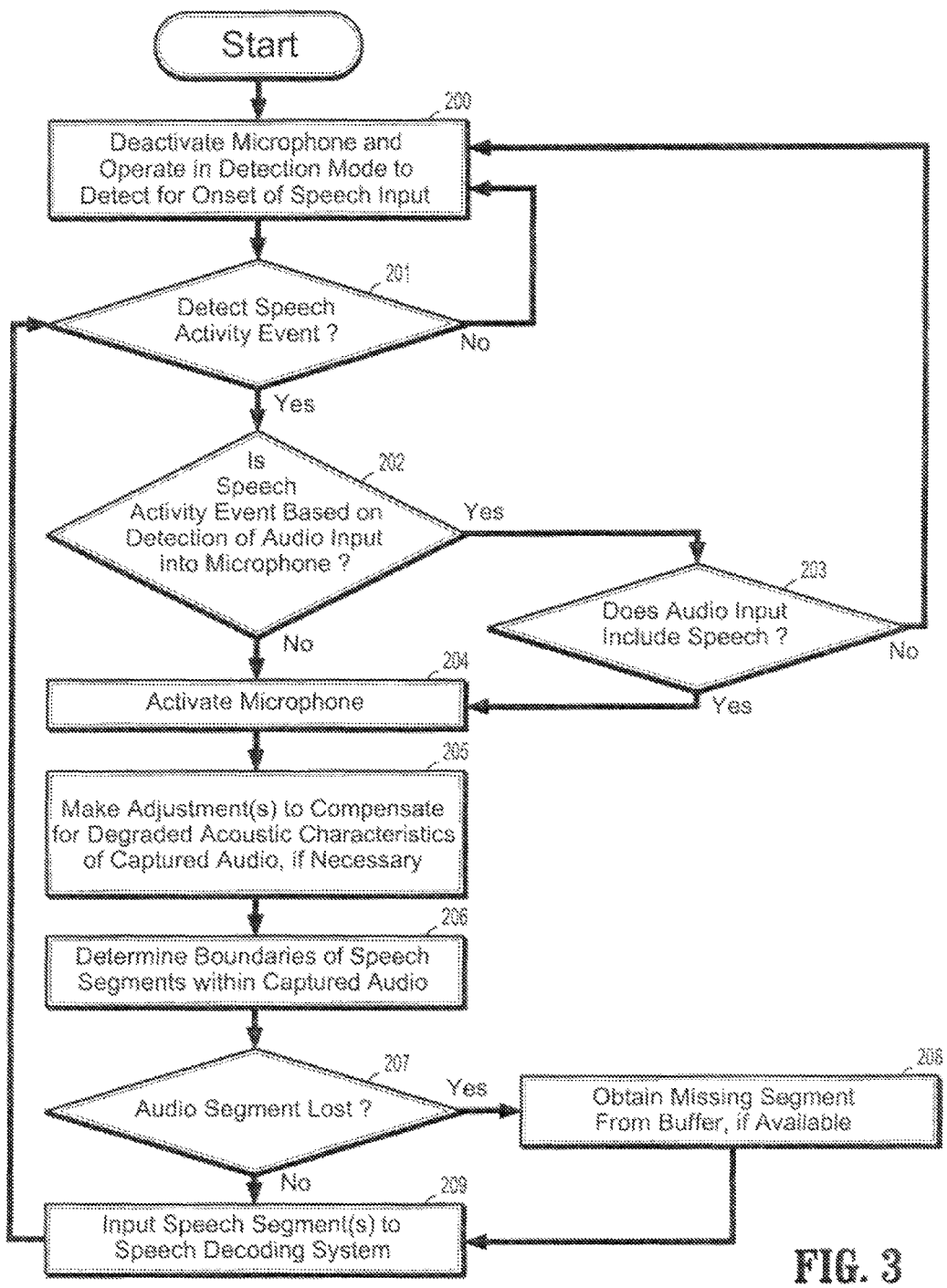
FIG. 3 is a flow diagram illustrating a method for implementing intelligent microphone control according to an exemplary embodiment of the invention.

FIG. 3 is a flow diagram of a method for controlling a microphone system according to an exemplary embodiment of the invention. FIG. 3 illustrates an exemplary mode of operation of the microphone manager (110) of FIG. 21. During operation, the microphone manager (110) will operate in a detection mode to detect for the onset of speech activity, while maintaining the microphone deactivated (step 200). In one exemplary embodiment of the invention, the microphone is maintained "deactivated" by the microphone manager (110) in the sense that the microphone is "on" and the system is listening for speech input, but that the audio input is not being recorded or otherwise applied to the speech decoding system until detection of a speech activity event (e.g., speech onset) (step 201). Depending on the application and memory capability, the system may be configured to continually record and store the audio input while the microphone is "deactivated" so as to enable detection of speech onset using audio-based techniques. Moreover, in other embodiments of the invention, as noted above, one or more microphones may be implemented for the sole purpose of capturing environmental noise or ambient noise (non-speech environment).

The microphone manager (101) operates in speech detection mode until a speech activity event is detected (step 201). In particular, when the microphone is in a "deactivated" state, microphone manager (110) will operate to detect a speech activity event that is indicative of the onset of speech activity or user intent to speak. For example, in the exemplary system of FIG. 2, speech activity events that are indicative of speech onset include user activation of a microphone control button (106) or speech activity events indicative of user intent to activate the microphone control button (106) using tactile sensors (106a) or (106b) or video sensors (104), which provide sensor data that allows the system to determine if a user has placed his/her finger on or near the microphone control button (106).

In addition, speech activity events indicative of speech onset can be events that are indicative of user intent to speak (e.g., utter a command) as determined from sensor data obtained using visual sensors (104) or biometric sensors (105). For example, visual or biometric sensors can be used to detect whether a user is looking at a microphone button with the intention to turn the microphone on and/or sensors that detect other types of user actions or conditions adding some context that increase the probability that the user intends to speak or otherwise utter a command.

In another embodiment, a speech activity event may be based on detection of audio input into the user microphone (i.e., the microphone that is intended for use in capturing speech, as opposed to a microphone that is implemented for capturing non-speech environment). If the speech activity event is based on the detection of audio input into the microphone (affirmative determination in step 202), a determination is then made as to whether the audio input includes speech (step 203). If the audio input is determined to foe noise or external audio (i.e. an audio outside of a car, or from radio etc.), the microphone will not be activated (negative determination in step 203).

When a speech activity event is detected (in step 201) and speech input is detected (affirmative determination in step 203), the microphone will foe activated (step 204). When the microphone is activated (step 204), the audio input is captured and recorded while the speech activity continues. During audio capture, the system may detect the existence of one or more conditions that can lead to degraded acoustic quality of the captured audio. The system may implement acoustic quality control methods to automatically make certain adjustments, if necessary, to compensate for the degraded acoustic characteristics of the captured audio (step 205). Exemplary acoustic quality control methods will be discussed in further detail below with reference to FIG. 4, for example.

While the microphone is activated and audio input to the microphone is captured and recorded, the system will determine the boundaries of speech segments within the captured audio (step 206) based on the timing of speech activity events (e.g., timing of speech onset events, speech offset events, etc.). If the system determines that an audio segment having speech data was lost (step 207), the missing segment can be obtained from an audio buffer, if available, and processed and added to the speech data applied to the speech recognition system (step 208).

By way of example, there may be a situation where actual speech onset occurs prior to the time at which speech onset events are detected by the system. In such instance, the initial speech data input will be "lost" in the sense that recording of audio input may begin at the time of detection of speech onset. If the system, is configured to actually begin capturing and recording of audio input upon speech onset detection, the beginning speech data segment may not be recoverable. However, the system can be configured to temporarily buffer blocks of audio input to ensure that segments of actual speech onset are recoverable, while temporarily buffered audio segments can be safely discarded after some period of time when it is assumed that such segment does not or would not contain speech data corresponding to speech onset activity. In other embodiments, as noted above, the system may be configured to record and persistently maintain all audio input in a local or remote buffer (black box, etc.) prior to detection of speech onset and microphone activation. The recorded audio input can be used by the microphone manager under circumstances were a "lost" audio segment with useful speech data can be extracted from the buffer and added to the complete the captured speech segments.

Thereafter, the speech segments within the captured audio will be input to the speech decoding system (step 209) and processed accordingly based on the given application. In this manner, the input to the speech decoding system will be limited to segments of the captured audio input having useful speech, while preventing the input of non-speech segments with noise from being input to the speech decoding system so as to enhance the decoding accuracy of the speech data.

Figure 4:
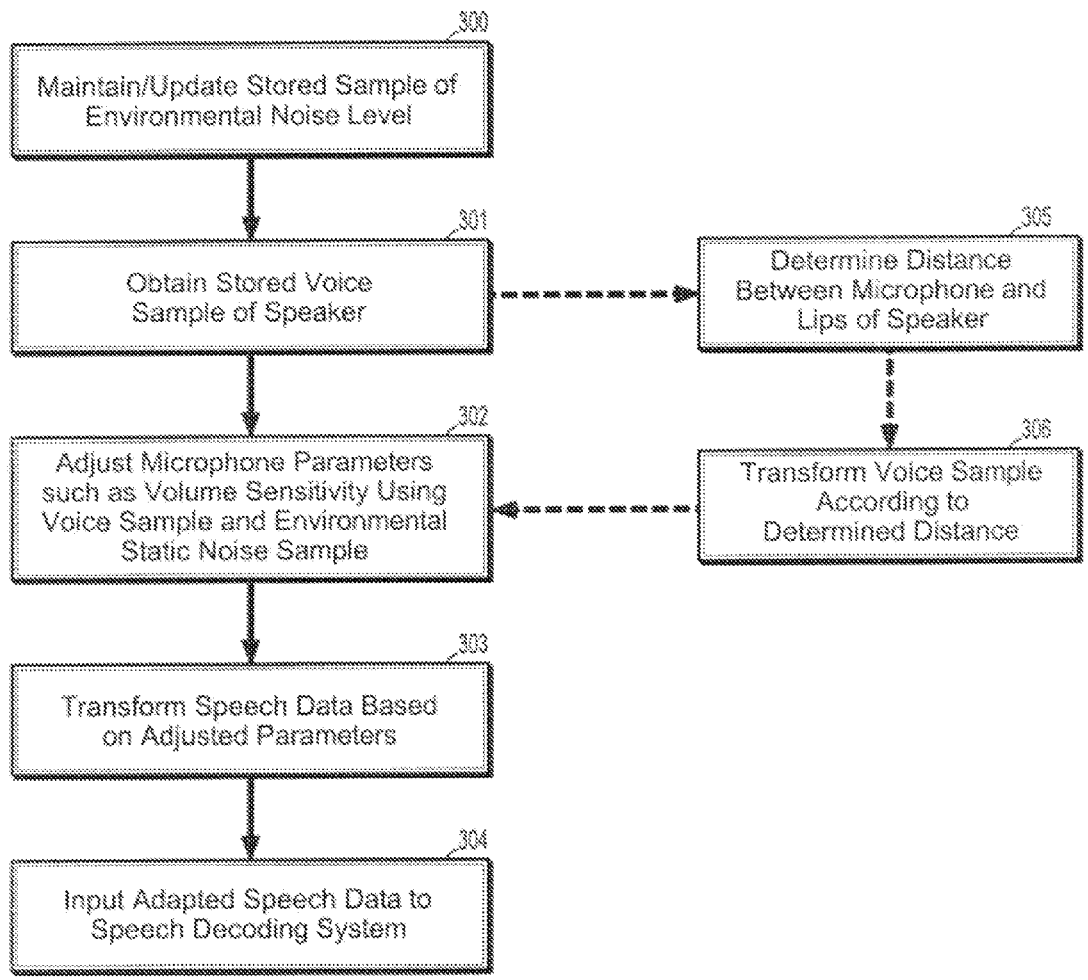
FIG. 4 is a flow diagram illustrating a method for implementing acoustic quality control according to an exemplary embodiment of the invention.

FIG. 4 is a flow diagram of methods for providing acoustic quality control according to exemplary embodiments of the invention. In particular, FIG. 4 illustrates exemplary methods for automatically adjusting microphone parameters to maintain the acoustic quality of captured audio, which may be implemented in step 205 of FIG. 3. In the exemplary embodiment of FIG. 4, acoustic quality control can be realized by adjusting microphone parameters and/or transforming speech data to correspond to the microphone parameters based on changes in environmental static noise level.

In particular, in one exemplary embodiment illustrated in FIG. 4, the system will maintain and periodically update a stored sample of static environmental noise (step 300). For instance, in the system of FIG. 2, the environmental noise sample/parameters (117c) can be generated and updated by tire environment interpretation system (113) and persistently stored in the local repository (117). Depending on the system configuration, the static environmental noise can be sampled using a microphone that is different from the microphone used for speech input, or the same microphone can foe used for sampling environmental noise and capturing speech input.

In this regard, the microphone system (101) in FIG. 2, for example, can include a microphone that is dedicated to capturing environmental noise and another microphone for capturing speech input. The environmental interpretation system (113) can implement known techniques for determining whether noise captured by the microphone is speech or static environmental noise. For instance, such techniques include silence detectors or Hidden Markup Model, and prototypes of different environmental sounds.

The system can adjust microphone volume sensitivity for a given user to adapt to changes in environmental static noise level. The system can obtain a stored voice sample of the user which provides information regarding volume of the speaker's voice. The system can use the voice and environmental noise samples to adjust the sensitivity and volume of the microphone input (step 302) using known processing techniques. The speech data is transformed or otherwise adapted based on the adjusted microphone parameters (step 303). The adapted speech data is then applied to the speech decoding system (step 304). By automatically adjusting the microphone parameters, the system may be better adapted to the speaker under changing noise levels to thereby enhance the quality of the captured speech data.

It is to foe appreciated that the exemplary method can be applied in various applications to make automatic adjustment of microphone parameters while eliminating the burden on the speaker to make such adjustments. For instance, this process is particularly useful for transcription applications where a microphone system used by different speakers must be adapted or adjusted to a speech recognition system for each speaker during a lecture. The first speaker will usually have trained the system prior to the lecture for his/her own voice and will have adjusted the microphone system accordingly. When the microphone system initially adjusts to the static environmental noise in a lecture center or conference room, the system may assume that this environment will be preserved with little changes in noise levels.

When new speakers approach the podium to speak, the system will use the initial environmental setting and apply it to the new speaker. Instead of the new speaker saying a phrase to allow the microphone system to adjust to the new sensitivity level, the system may automatically adjust the microphone parameters using a stored sample of the phrase and the environmental noise level sample using the method of FIG. 4. This eliminates the need for each new speaker to utter a phrase into the microphone to adjust the microphone and system setup. Each time a new speaker activates his or her own speech model, a voice sample of the speaker may be obtained and used by the system in parallel with the stored environmental noise level to adjust for sensitivity. In reality, the environmental noise level will change based on different amounts of people in the audience and at different periods during the lecture/conference. The system may continuously make adjustments to the static environmental noise when the speaker is not speaking, e.g., pauses between phrases and statements as well as in between actual speakers.

In another exemplary embodiment of the invention, acoustic quality control methods are implemented to adjust microphone parameters based on changes in distance between a microphone and a speaker's mouth. For example, as illustrated in FIG. 4, methods can be implemented to determine a distance between a microphones and the speaker's lips (step 305), where such distance measure is used to transform the voice sample (step 306). A sensor (e.g., camera) may be used to measure the distance from, the speaker's lips to the microphone. The measured distance can be processed using an algorithm that automatically adjusts the volume of the user's voice sample based on the new distance between the speaker's lips and the microphone. Thereafter, the microphone parameters are adjusted using the current environmental noise sample and the adapted voice sample (step 303).

In other exemplary embodiments of the invention, acoustic quality control can be implemented by adapting captured audio containing speech data of a given speaker according to characteristics of the microphone that the speaker used to train the speech decoding system. This may foe implemented in various ways. For example, in one embodiment, a hybrid system of microphones can be used that would contain different microphones equivalent to those that may be used to train the speech decoding system. When a person begins to speak into the ASR system, the system can determine the type of microphone that the person used when training the ASR system, and then activate a corresponding microphone within the hybrid system to capture the speech input. This would allow the speaker to speak through a microphone that is equivalent to the microphone that was used to train the system. In another exemplary embodiment, the hybrid system may adapt the electromagnetic sensor to match the structure and characteristics of the microphone used by the speaker at the time of training.

In yet another embodiment, the system may implement an algorithm that changes the signal from one microphone to another. In other words, if the speaker were speaking into a microphone that was not similar to the one used for training, the system could modulate the audio signal received from the speaker's current microphone to match the signal of the training microphone.

It should be noted that the acoustic quality control systems and methods as described herein according to exemplary embodiments of the invention may be implemented using any one or more of known speech/audio processing techniques that are suitable for microphone/speech processing applications to effectively compensate for mismatch conditions between training and real-time conditions as a result of speaker variability, changes in acoustic environmental noise, and changes in acoustic channels. In this regard, various techniques failing within general categories of feature processing techniques and model adaptation techniques may be implemented by the acoustic quality control system to prevent degradation in speech decoding accuracy due to such mismatch conditions. With these schemes, mismatch is reduced through the transformation or modification of features or model parameters according to some criterion.

For instance, methods for transforming speech data according to exemplary embodiments of the invention may be implemented using known feature transformation techniques to adapt acoustic speech data and compensate for mismatches in acoustic channel including, for example, those techniques disclosed in the article by J. Pelecanos, et al, entitled "*Addressing Channel Mismatch through Speaker Discriminative Transforms*", Speaker and Language Recognition Workshop, 2006, IEEE Odyssey 2006, which is incorporated herein by reference. In general, Pelecanos, et al., discloses a feature transformation scheme which performs a direct mapping of features from one channel type to an assumed undistorted target channel, wherein the direct transformation of features is performed using a discriminative criterion. The process performs a transformation dependent upon the channel type of a test recording and the desired target channel type to which the features are to be mapped. With this scheme, the adaptation of speech data does not require changes to speaker models, but rather the acoustic input (speech) is transformed to adapt to the speech data according to the different types of acoustic channels or changes in an accuse be channel.

In the context of the claimed inventions, this and other speech adaptation schemes may be applied to "acoustic channels" within the microphone environment, where changes in "acoustic channels" include changes in the distance between the speaker's lips and the microphone, changes in the microphone configuration or parameters by speakers, etc. The underlying techniques for transforming/adapting speech data can be applied to various types of acoustic channels.

Moreover, various model adaptation techniques may foe implemented in which speech, channel and background noise model parameters are adapted to account for mismatches. For instance, U.S. Pat. No. 6,383,393 to Gong, entitled "Method of Adapting Speech Recognition Models for Speaker, Microphone and Noisy Environment", which is incorporated herein by reference, discloses a two-stage model adaptation scheme based on maximum-likelihood linear regression (MLLR). More specifically, Gong discloses a two-stage model adaptation scheme wherein the first stage adapts a speaker-independent HMM (Hidden Markov Model) seed model set to a speaker/microphone-dependent model set and a second stage wherein the speaker/microphone-dependent model set is adapted to a speaker/microphone/noise-dependent model set that is used for speech recognition.

It is to be understood that exemplary systems and methods described herein may be implemented in various forms of hardware, software, firmware, special purpose processors, or a combination thereof. For example, the microphone manager (110) and speech recognition system (120) can foe implemented as applications comprising program instructions that are tangibly embodied on one or more program storage devices (e.g., hard disk, magnetic floppy disk, RAM, CD ROM, ROM and Flash memory) and executable by any device or machine comprising suitable architecture. It is to be further understood that since the constituent system modules and method steps depicted in the accompanying Figures may be implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

Although exemplary embodiments of the present invention have been described herein with reference to the accompanying drawings, it is to be understood that the invention is not limited to the exemplary embodiments, and that various other changes and modifications may be affected therein by one skilled in the art without departing from the scope or spirit of the invention. All such changes and modifications are intended to be included within the scope of the invention as defined by the appended claims.

What is claimed is:

1. An audio processing system, comprising;

a microphone system, comprising a microphone for capturing audio input to the microphone system;

a microphone manager to (i) control capturing of audio input to the microphone system, (ii) control recording of captured audio, (iii) detect speech activity events, (iv) determine speech segments of captured audio comprising speech data based on timing of one or more detected speech activity events, (v) selectively output speech segments within captured, audio to a speech decoding system; and to (vi) detect an environmental condition regarding capturing of audio, which can result in captured audio with acoustic characteristics that adversely affect a decoding accuracy of the captured audio;

a sensor system comprising one or more sensor devices to generate sensor data which is processed by the microphone manager to detect speech activity events and environmental conditions, wherein the microphone manager selectively activates one of a plurality of different types of microphones of the microphone system according to the environmental condition regarding capturing of audio, wherein the microphone manager detects an environmental condition where a speaker uses a microphone in the microphone system which is different from a microphone used by the speaker for training the speech decoding system, and wherein a selectively activated one of a plurality different types of microphones of the microphone system is the same or similar to the training microphone.

2. The audio system of claim 1, wherein the microphone manager automatically adjusts one or more microphone parameters and speech decoding parameters to compensate the degraded acoustic characteristics of the captured audio.

3. The system of claim 2, wherein the microphone manager maintains and periodically updates a sample of an environmental static noise level and a stored voice sample of a speaker, and automatically adjusts microphone volume sensitivity for the speaker based on a current sample of the environmental static noise level and the voice sample of the speaker.

4. The system of claim 3, wherein the sensor system, comprises a sensor device which generates sensor data which is used to determine a distance between a microphone and a speaker's mouth, wherein the microphone manager automatically adjusts microphone volume level based on a current distance between the microphone and the speaker's month, and automatically adjusts microphone volume sensitivity by transforming a volume parameter of the stored voice sample of a speaker based on the current distance, and transforming the speaker's speech input to a microphone to adapt the microphone volume sensitivity based on the stored voice sample of the speaker and a scored sample of the current environmental static noise level.

5. The system of claim 1, wherein the microphone manager modulates an audio input to the microphone to substantially catch an audio signal of the training microphone.

6. The system of claim 1, wherein the one or more detected speech activity events include detection of microphone switch button actions and detection of speech in captured audio.

7. The system of claim 1, wherein the one or more detected speech activity events include detection of user intention to speak into the microphone and detection of speech in captured audio.

* * * * *